United States Patent Office 3,220,429
Patented Nov. 30, 1965

3,220,429
APPARATUS FOR DELIVERING TWO LIQUIDS IN A FIXED RATIO
Hiyoshi Tatsuno, 161 Hommuracho Azabu, Minato-ku, Tokyo, Japan
Filed Apr. 9, 1963, Ser. No. 271,715
Claims priority, application Japan, July 5, 1962, 37/28,230
3 Claims. (Cl. 137—100)

This invention relates to apparatus for the fixed ratio distribution of liquid into two liquid quota that is operable at high accuracy and adapted for safety devices.

Generally devices for measuring two liquids respectively by two separate flow meters and dispensing the two liquids at a fixed ratio of distribution by coupling the two flow meters respectively with changing speed gears are conventionally known. However such devices are usually required to be constructed in a large size, in order to amplify such changing speed gears, because the changing speed gears will be subjected to a large force, as when feeding ratios are at high unbalance with the feeding capacity for one liquid quota, or when the flow meter for the other is subjected to braking action. Accordingly, the accuracy will decrease and/or division of the feeding ratio takes place disadvantageously. More particularly, when feeding of one liquid quota is stopped, a disadvantage occurs in that only the other liquid quota is supplied.

In accordance with the present invention, a fixed ratio distributing method of liquid into two quota is contemplated for avoiding the aforementioned disadvantages, characterized in that a pair of rotary members each having a fluid bore at an appropriate position are rotated in abutment with each other, and a rotary shaft of a flow meter for each of the two liquid quota is coupled with each of the rotary members, respectively, and a changing speed gear is inserted at an intermediate portion of each rotary shaft, thus permitting pasage of one liquid quota alone through the bore. Thus, according to the present invention, the two liquid flow meters are not mechanically connected, thus constituting an operational manner in which a valve of the passage for liquid quota A is actuated by the rotary shaft of the flow meter for liquid quota B. Consequently, substantially no load is added to the changing speed gear. As a result, the changing speed gear may be of a small size and, moreover, as the feeding of liquid quota A alone may be avoided, the function of a safety device is advantageously attained.

Further, the present invention is contemplated to provide a fixed ratio distributing method for two liquid quota, characterized in that, with an object similar to the aforementioned, when the relative position of each central output shaft of the flow meters for two liquid quota is constant, two liquids are fed at a fixed ratio, and when the relative position of two shafts moves by decreasing or stopping the passage of one liquid quota, flow of the other liquid quota is automatically oppressed or stopped. Thus, according to the method of the present invention, when the flow meters for two liquids quota A and B are coupled with each other through an appropriate changing speed gear and the two liquid quota are fed at a fixed ratio, the fixed ratio will be always maintained, in such a manner that the supply of liquid quota A may be reduced on account of change of viscosity of liquid quota A, change of the capacity or due to the impurities in liquid; the supply of liquid quota B may be limited, also if the supply of liquid A is stopped, that of liquid quota B will also be stopped. Now, if the above construction is utilized in a distributing device for a mixed oil of gasolene and oil used in a two cycle internal combustion engine, the mixed oil can always be supplied at predetermined mixing ratio, and in particular, the danger in feeding only of gasolene can be avoided.

Another object of this invention is to dispense two liquids in a fixed ratio distribution by simplified apparatus including two rotary members each having a bore are provided at a substantially middle position of a closed cylindrical chamber, with central shafts of the two rotary members being exposed outside such closed chamber; the flow meter for liquid quota A being connected to one shaft with a discharging tube from the flow meter being opened to one end of the closed chamber, and a flow meter is connected with the other shaft for liquid quota B through the changing speed gear. On the other hand, in another embodiment of the invention, a substantially similar apparatus can be obtained, excepting the closed chamber is in an improved form.

In addition, according to the present invention, the fixed ratio distribution of many such liquid quota is adjustable by presetting a plurality of such units referred to above.

In the following paragraphs, the present invention will be described by way of example in further detail in connection with the accompanying drawings, of which;

Figure 1:
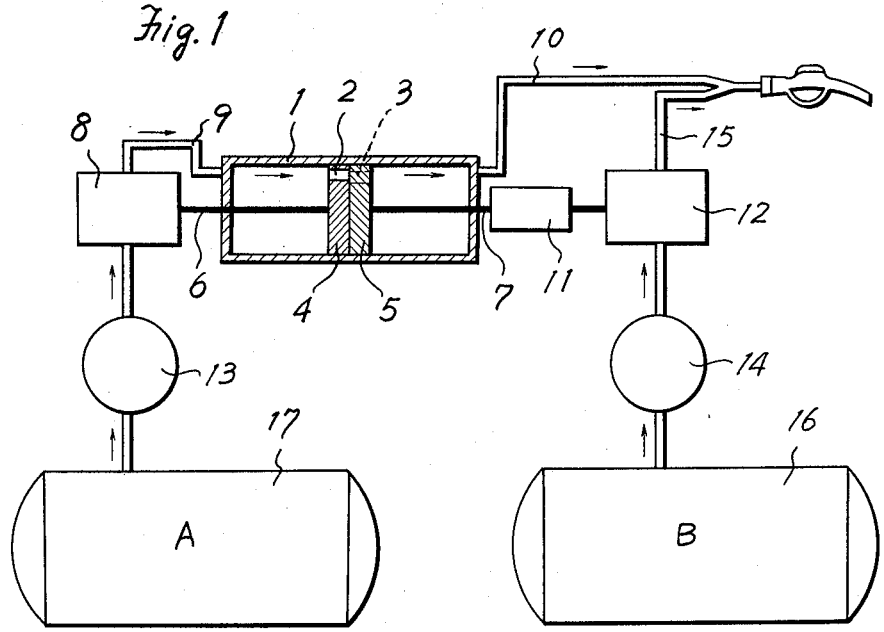
FIG. 1 is a schematic arrangement of an apparatus embodying the present invention.

It is, of course, possible to make various modifications, without departing from the spirit and scope of the invention as defined by the appended claims hereof. Similar reference numerals are used for similar parts throughout the whole specification.

Referring to the drawings, 1 represents a closed cylindrical chamber; 2 and 3 are bores in a pair of rotary bodies 4 and 5, respectively. 6 and 7 represent central shafts; 8 is a flow meter; 9 is a discharge pipe; 10 is an exhaust pipe, 11 is a changing speed gear and 12 is a flow meter respectively. An approximately central position of the closed cylindrical chamber, two rotary bodies 4, 5 having bores 2, 3 are respectively provided at suitable places. Central shafts 6, 7 secured to the two rotary bodies are protruded outwardly from the closed cylindrical chamber; the central shaft 6 is connected to the flow meter 8 for liquid quota A, and the discharge pipe 9 of the flow meter 8 is opened to one end of the closed cylindrical chamber 1 while the delivery pipe 10 is introduced out of the other end of the closed cylindrical chamber. The central shaft 7 is connected with the flow meter 12 for liquid quota B through the changing speed apparatus 11.

Figure 2:
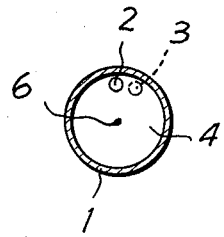
FIG. 2 is a sectional view of a closed cylindrical chamber of the apparatus of FIG. 1.

Functions of the above apparatus will become apparent from the following description of its sequence of operation. It will be assumed that liquid quota A moves faster than liquid quota B because of its viscosity. To begin with, as pumps 13, 14 in FIG. 1 are operated, the liquid quota A of the liquid tank 17 is introduced into the flow meter 8 through the pump 13, and thence into the closed cylindrical chamber 1 through the discharging pipe 9; since the bores 2, 3 of the rotary bodies 4, 5 are not in alignment with each other as shown in FIG. 2, such liquid will not be permitted to move towards the other end of the closed cylindrical chamber 1, whereby the liquid quota A is not being supplied.

In the aforementioned case, if the bores are aligned, the liquid A is moved through the two bores and consequently, when liquid quota A flows, the flow meter 8 operates and a disk 4 rotates through the central shaft 6 secured to the flow meter. With rotation of the disk 4, the bores 2, 3 are relocated to an unaligned position, and flow of liquid quota A is stopped immediately. On the other hand, liquid quota B of the liquid tank 16 is fed by a pump 14 from the exhausting tube 15 through the flow meter 12.

Thus, when the flow meter 12 rotates, the rotation of the central shaft 7 is transmitted to the rotary body 5 through the changing speed gear 11. When the rotary body 5 rotates, then the bores 2, 3, having thus far been out of alignment, will come into alignment. Accordingly as referred to above, liquid quota A introduced on one side the closed cylindrical chamber 1 is continuously delivered from the exhaust pipe 10 through the bores 2, 3. When liquid quota A flows, the flow meter 8 rotates then, the rotary body 4 also rotates, and while the bore 2 tends to depart from the bore 3 of the rotary body 5, the bore 2 actually follows the bore 3 of the rotary body. As a result, the liquid quota A is passed through said bores 2, 3 with the result that liquid quota A is fed through the discharge pipe 10, while liquid quota B is fed simultaneously through the discharge pipe 15. In this case, between the flow meter 12 and rotary body 5 both liquid quota are fed with a changing speed ratio determined by the ratio of the changing speed gear 11, which may be of a fixed or variable ratio.

On the other hand if the B-liquid tank 16 is evacuated and when no liquid quota B is fed, the flow meter 12 will not work, and consequently the rotary body 5 will not rotate. As the bores 2, 3 are not, therefore, in alignment with each other, liquid quota A will not be fed. Therefore, an exclusive feeding of liquid quota A may be avoided.

Figure 3:
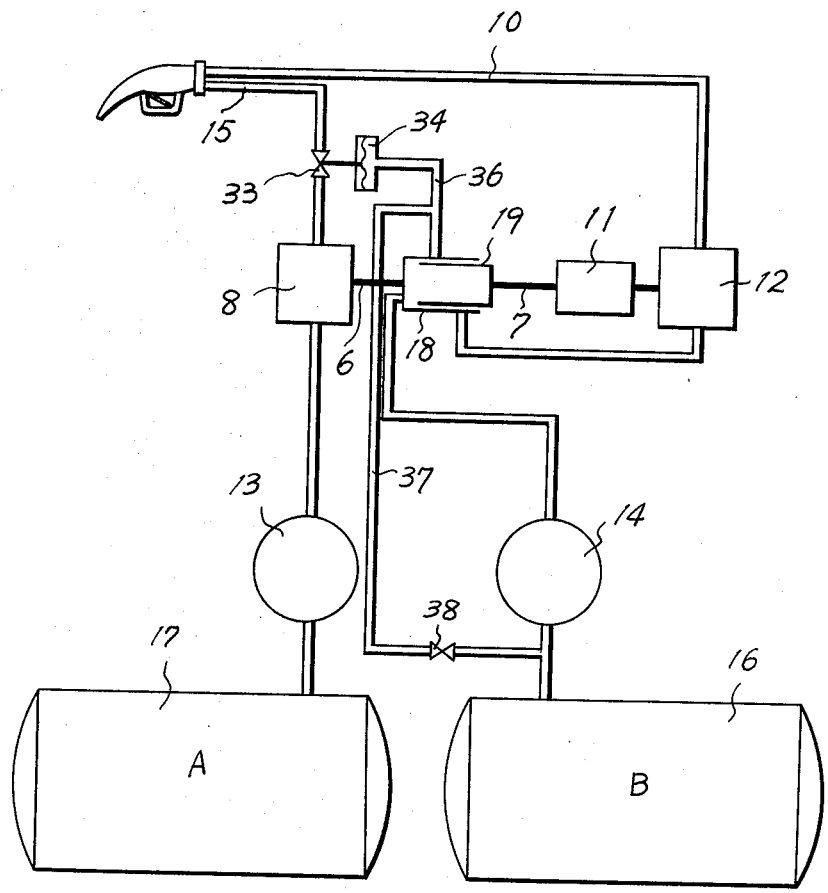
FIG. 3 is another schematic arrangement of an apparatus embodying a modification of the present invention.
Figure 4:
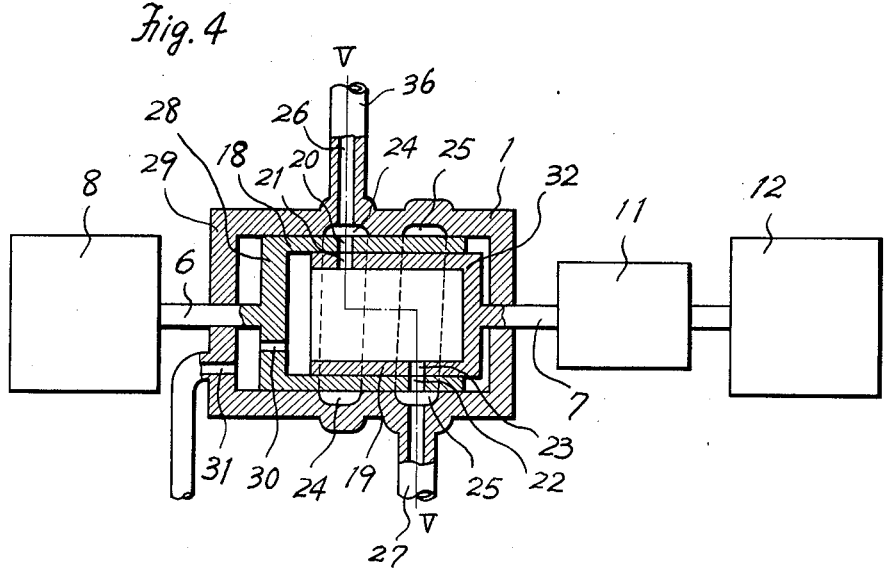
FIG. 4 is a longitudinal section near the closed cylindrical chamber of said apparatus.
Figure 5:
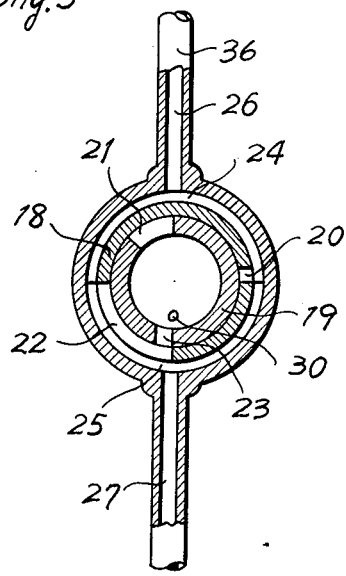
FIG. 5 is a sectional view taken along the staggered line V—V of FIG. 4 but with the cylinders rotated to their normal operating positions.

With another modification, when the amount of one liquid quota to be fed is lowered or halted for some reason, the other liquid quota is oppressed or stopped by the apparatus illustrated in FIGS. 3 through 5. Two bottomed cylindrical bodies 18 and 19 are provided in a closed cylindrical chamber, with one cylindrical body being telescopingly inserted in the other cylindrical body; each cylindrical body has two radial bores defining two sets of aligning holes 20–21 and 22–23 which may meet at different times. Annular grooves 24 and 25 are provided opposite the aligning holes 20, 22 on the inner surface of said closed cylindrical chamber, and external conduits 26 and 27 communicate with the annular grooves 24, 25, respectively. The bottom plate 28 of a bottomed cylindrical body 18 and the end plate 29 of the closed cylindrical chamber 1 opposite said bottom plate 28 are provided with openings 30 and 31 respectively. The bottom plate 28 and an end plate 32 of the cylinder body 19 are connected respectively with central shafts 6, 7 of the flow meters 8, 12 for output, while the opening 31 communicates with a tank 16 for liquid quota B through the pump 14 and the conduit 27 is connected with the flow meter 12. The conduit 26 is connected to an operating portion 34 of the valve 33, that closes under positive pressure, through a connecting pipe 36. The valve 33 is inserted in an intermediate portion of a distributing pipe 15 for liquid A and a branch pipe 37 extending from the connecting pipe 36 is connected to the tank 16 for liquid quota B through a valve 38; the changing speed gear 11 is inserted in the central shaft 7 to complete the construction of the apparatus shown in FIG. 3.

The operation of the above apparatus will be explained in the following sequence of operation. It is to be assumed that the revolving velocity of the bottomed cylinder 19 is faster than that of the bottomed cylinder 18, i.e., the feeding velocity of liquid B is faster than that of liquid A. As shown in FIG. 3, when pumps 13, 14 are put into operation, both liquid quota A and B accommodated in the liquid tanks 17, 16 are pumped up with pumps 13, 14 and submitted to pressure. The liquid quota B proceeds to the inside of the bottomed cylindrical body 19 through the openings 31 and 30 and thence through the aligned holes 22, 23 as illustrated in FIG. 5. When the holes 20, 21 are out of alignment, the liquid quota B in the bottomed cylindrical body 19 proceeds through the holes 22, 23, annular groove 25, and conduit 27 to the flow meter 12. However, since the holes 20, 21 are not in alignment with each other, the operation part 34 has not been fed with any liquid quota B under pressure, and the valve 33 remains opened. As a result, the liquid quota A in the liquid tank 17 is supplied, through the pump 13, flow meter 8 and valve 33 to the delivery pipe 15. Accordingly, the central output shaft 7, 6 of the flow meters 12, 8, are rotated and the bottomed cylindrical bodies 18, 19 incorporated with said central shaft are likewise rotated.

Now then, when the feeding amounts of both liquids quota A, B are sufficient, bottomed cylindrical bodies 18, 19 rotate at equivalent velocity. When both liquids are fed according to the feeding ratio, for instance, 15:1 as determined by the changing speed ratio of the changing speed gear 11, the relative position of the cylindrical bodies 18, 19 will not change, and accordingly the holes 22, 23 continuously are in alignment with each other and thus the liquid quota B is supplied.

In the next place, when either the flow meter 12 or the changing speed gear 11 happens to be out of order, and consequently, when the feeding amount of liquid quota B is reduced, namely, when the feeding ratio for both liquid quota A, B is reduced below 15:1, the rotation of the bottomed cylindrical body 19 lags behind that of the cylindrical body 18, and the relative position of both cylindrical bodies is rearranged; and if such a state is maintained, the holes 22, 23 will eventually become unaligned. However, since the hole 22 forms an extended arc along the periphery, the holes 22, 23 will be in alignment with each other at the same time that the holes 20, 21 are in alignment with each other, until the liquid quota B finally reaches the operating part 34, through the holes 21, 20, the annular groove 24 and the conduit 26. As such operating part is thereby compressed, the valve 33 is closed to some extent. Hence, the flowing amount of liquid quota A is reduced causing reduction of rotation of the central output shaft 6 of the flow meter 8; thus as rotation of the bottomed cylindrical body 18 is reduced, the lag of the cylindrical body 19 is restored and the alignment of holes 20, 21 is lowered, the valve 33 is opened. Thus, both liquid quota A and quota B will always be supplied with a constant feeding ratio, while retaining an appropriate equalized feeding ratio.

Furthermore, when the supply of liquid quota B is stopped on account of either the flow meter 12 or changing speed gear 11 being out of order, the holes 21, 20 will become aligned with each other, and simultaneously as the passages are opened to a maximum extent, a maximum pressure is imparted to completely close the valve 33 and likewise supply of liquid quota A stopped. Alignment of the holes 20 and 21 closes the valve 33 whereupon the meter 8 and its shaft 6 will cease to rotate; however, should the flow of liquid A not be cut off immediately resulting in misalignment of the holes 20 and 21, the liquid pressurizing the operator 34 maintains the valve 33 closed because the return of such liquid to the tank 16 is restricted by the flow valve 38.

Further, since when the hole 22 is formed as an extended arcuate hole along the periphery, the holes 22, 23 remain in alignment with each other, even when the feeding ratio decreases more or less without closing the valve 33, the sensitivity may be controlled by the arcuate length of the hole 22. And moreover, even when the holes 20, 21 are closed, or even if, pressure liquid to some extent leaks, the liquid passes through a leading pipe 36 and the branch pipe 37 to return the pressure liquid to the liquid tank 16, in order to avoid closing of the valve 33 due to the pressure of leakage liquid acting on the operating part 34. In this case, when the liquid flows with no resistance in the leading tube 36, if the holes 20, 21 coincide and then sufficient flow of pressured liquid is permitted, a valve 38 may be provided midway on the branch pipe 37 and the flow amount made appropriate by controlling the opening of the valve 38 to obtain a safety device as some parts of the operating part 34 are not compressed.

Furthermore, referring to the said two embodiments of this invention, liquid passing across the closed chamber 1 is liquid A in FIG. 1, while liquid passing across the closed chamber is liquid B in FIGS. 3 and 4. In this case, as the rate of flow is made capable of being controlled by opening bores 2 and 3 as apparent in FIG. 1 and holes 22 and 23, as in FIGS. 3 and 4, the relative positions of rotary bodies 4, 5 or 18, 19 are assured by establishing the flow rate so that the angular velocities may be accelerated at the shaft 6 and 7 for each flow meter.

What I claim is:

1. Apparatus for delivering two liquids in a fixed ratio, the combination comprising a supply of each liquid, a flow meter for each liquid supply, a delivery pipe communicating with one of said flow meters, chamber means having one end communicating with the other of said flow meters and having another end communicating with said delivery pipe, control means in said chamber means controlling a flow of liquid from said one end to said another end, an operative connection between each of said flow meters and said control means and being operated in response to liquid flow through each of said flow meters whereby the flow of liquid from said another end of the chamber means to the delivery pipe is dependent upon the flow of liquid in each of said flow meters, said control means including two rotating members having flow apertures therethrough, each operative connection including a rotary shaft between its flow meter and its rotating member whereby said two rotating members are capable of relative rotation, said rotating members being cylindrical bodies having closed bottom walls and being opened on their opposite ends, said cylindrical bodies being telescoped in each other and having their bottom walls connected to their corresponding rotary shaft, and said aperture means including two holes extending radially through each cylindrical body to define two sets of alignable apertures, one set of said alignable apertures communicating with the other said flow meter, a pressure operated valve means controlling flow of liquid from the said one flow meter to said delivery pipe, and means establishing communication between said pressure operated valve means and the other set of said alignable apertures.

2. The combination as recited in claim 1 wherein one of said apertures defines an arcuate extension about the periphery of its cylindrical body.

3. The combination as recited in claim 1 wherein return conduit means establishes communication between said communication means and one of said liquid supplies.

References Cited by the Examiner
UNITED STATES PATENTS

| | | | |
|---|---|---|---|
| 1,480,837 | 1/1924 | Reineke | 137—100 |
| 2,195,005 | 3/1940 | Grosvenor et al. | 137—100 |
| 2,754,837 | 7/1956 | Clemens | 137—99 XR |
| 3,033,219 | 5/1962 | Erle | 137—100 |
| 3,092,129 | 6/1963 | Steen | 137—100 |

M. CARY NELSON, *Primary Examiner.*

MARTIN P. SCHWADRON, *Examiner.*